US008417830B2

(12) United States Patent
Guo

(10) Patent No.: US 8,417,830 B2
(45) Date of Patent: Apr. 9, 2013

(54) SYSTEM AND METHOD FOR SHARING MULTIMEDIA BROADCASTING PROGRAM

(75) Inventor: Suguang Guo, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 0 days.

(21) Appl. No.: 13/202,900

(22) PCT Filed: Jun. 30, 2009

(86) PCT No.: PCT/CN2009/072536
§ 371 (c)(1),
(2), (4) Date: Aug. 23, 2011

(87) PCT Pub. No.: WO2010/108344
PCT Pub. Date: Sep. 30, 2010

(65) Prior Publication Data
US 2012/0005363 A1    Jan. 5, 2012

(51) Int. Cl.
*G06F 15/16* (2006.01)
*G06F 12/00* (2006.01)

(52) U.S. Cl.
USPC .......................................... 709/231; 709/250

(58) Field of Classification Search .......... 709/223–225, 709/231–234, 250
See application file for complete search history.

(56) References Cited

U.S. PATENT DOCUMENTS

| 2006/0036610 A1* | 2/2006 | Wang .............................. 707/10 |
| 2006/0127037 A1* | 6/2006 | Van Hoff et al. ................ 386/83 |
| 2006/0200534 A1* | 9/2006 | Nagai et al. .................... 709/212 |
| 2007/0050500 A1 | 3/2007 | Rim et al. |
| 2008/0115170 A1* | 5/2008 | Ray et al. ........................ 725/58 |
| 2008/0294762 A1* | 11/2008 | Fish, III ......................... 709/223 |
| 2010/0095347 A1* | 4/2010 | Chase ............................ 725/151 |

FOREIGN PATENT DOCUMENTS

| CN | 1925448 A | 3/2007 |
| CN | 101150464 A | 3/2008 |
| CN | 101364923 A | 2/2009 |
| WO | 2008047184 A1 | 4/2008 |

OTHER PUBLICATIONS

International Search Report for PCT/CN2009/072536, English Translation attached to Original both completed by the Chinese Patent Office on Dec. 23, 2009, All together 4 Pages.

* cited by examiner

*Primary Examiner* — Zarni Maung
(74) *Attorney, Agent, or Firm* — Brooks Kushman P.C.

(57) ABSTRACT

A system and method for sharing multimedia broadcasting programs, which are applied among a plurality of PCs belonging to the same subnet. A wireless data terminal is configured in a first PC. When other PCs in the subnet want to share the multimedia broadcasting program with the first PC, they sending sharing requests to the first PC, and the first PC forwards the sharing requests to the wireless data terminal. After the wireless data terminal converts the multimedia broadcasting program to be in the format of streamlining media, it sends the program to the PCs initiating the sharing requests via the first PC. The multimedia broadcasting signal received through the wireless can be shared in a wired network.

15 Claims, 4 Drawing Sheets

SYSTEM AND METHOD FOR SHARING MULTIMEDIA BROADCASTING PROGRAM

CROSS-REFERENCE TO RELATED APPLICATION

This application is the U.S. national phase of PCT Application No. PCT/CN2009/072536 filed Jun. 30, 2009, which claims priority to Chinese Application No. 200910130198.4 filed Mar. 25, 2009, the disclosures of which are incorporated in their entirety by reference herein.

TECHNICAL FIELD

The present invention relates to the field of mobile communication technology, and more especially, to a system and method for sharing multimedia broadcasting program.

BACKGROUND OF THE RELATED ART

To date, with the general popularization of the 3$^{rd}$ Generation (3G) wireless network, the network transmission speed increases, and more and more services based on the 3G network, including the cell phone TV, are developed. With the increased speed of 3G network, using wireless network to transmit the TV signal and using the terminal equipment such as a cell phone or a wireless data terminal to watch TV are more and more popularized services. CMMB (China Mobile Multimedia Broadcasting) is a typical one in this kind of services.

FIG. 1 is a structural block diagram of the system of the traditional wireless data terminal supporting the multimedia broadcasting, and the system comprises a PC and a wireless data terminal. Wherein, the PC comprises a program control module and a customized player module, and the program control module is used to search the channels and pilot the programs, while the customized player module is used to play the audio and video data stream so that the users can watch programs. The wireless data terminal comprises a multimedia broadcasting processing chip, a multimedia broadcasting data processing module, a program management module, an AT command analysis module, and a protocol stack and a USB (universal serial bus) transmission module. Wherein, after the multimedia broadcasting processing chip performs the down-conversion and decoding of the digital signal, the multimedia broadcasting data processing module which connects with the multimedia broadcasting processing chip via the interface 1 repackages the decoded digital signal into a format which can be used by the PC, and sends the signal to the USB transmission module via interface 2, and then the decoded digital signal is transmitted by the UBS transmission module to the PC, meanwhile, the AT command analysis module receives the PC's AT command from the USB transmission module via interface 5 and performs the corresponding processing, if the command relates to the multimedia broadcasting, the AT command analysis module calls the program management module which connects with it via interface 4 to search the channels or order programs etc. Moreover, the program management module connects with the multimedia broadcasting processing module via interface 3, and the protocol stack connects with the AT command analysis module via interface 6 and with the USB transmission module via interface 7 respectively.

As a standard COM device based on the USB interface, such as interface 8 and interface 9 in FIG. 1, the wireless data terminal communicates with the PC, wherein, interface 9 is a two-way interface which is used to transmit the AT commands (such as registering the network, selecting programs, and so on) from both the PC and the wireless data terminal sides; interface 8 is a one-way interface, the wireless data terminal uses it to transmit the program data to the PC, and the PC receives the data from the COM interface, and decodes and plays the data.

To sum up, the wireless data terminal supporting the multimedia broadcasting can implement the function of playing the multimedia broadcasting program by cooperating with the PC. However, this kind of multimedia broadcasting wireless data terminal can only play the programs by working with its cooperative PC, and it cannot share the programs with others.

SUMMARY OF THE INVENTION

The present invention provides a system and method for sharing the multimedia broadcasting program to overcome the defect that the multimedia broadcasting program cannot be shared.

In order to solve the above problem, the present invention provides a method for sharing multimedia broadcasting programs, applied among a plurality of PCs in the same subnet among which a first PC is configured with a wireless data terminal, and the method comprises:

when other PCs in the subnet want to share a multimedia broadcasting program with the first PC, the PCs sending sharing requests to the first PC, the first PC forwarding the sharing requests to the wireless data terminal; after converting the multimedia broadcasting program to be in a format of streaming media, the wireless data terminal sending the program to the PCs which send the sharing requests via the first PC.

Furthermore, the above method may also have the following features:

the wireless data terminal communicates with the first PC via an universal serial bus (USB) network device interface; an internet protocol (IP) address IP1 of the wireless data terminal is in the same subnet in which the IP address IP2 of the USB network device interface in the first PC is, while is not in the same subnet in which the IP address IP3 of the first PC is; and the first PC saves a routing relationship between IP2 and IP3.

Furthermore, the above method may also have the following features:

the USB network device interface in the wireless data terminal is obtained by enumerating the interface by the wireless data terminal.

Furthermore, the above method may also have the following features:

the IP address IP1 of the wireless data terminal is allocated by the wireless data terminal.

Furthermore, the above method may also comprise:

before sending the sharing requests, the PCs assigning uniform resource locator (URL) address to the IP1 in streaming media players in the PCs.

Furthermore, the above method may also comprise:

after converting the multimedia broadcasting program to be in the format of streaming media, the wireless data terminal sending the program to the first PC; after receiving the program, the first PC using a standard streaming media player thereof to play the multimedia broadcasting program.

To solve the above problem, the present invention also provides a system for sharing multimedia broadcasting programs, comprising: a first personal computer (PC) and a wireless data terminal working cooperatively with each other, and other PCs which are located in the same subnet in which the first PC locates; wherein:

the other PCs is used to send sharing requests to the first PC when the other PCs want to share the multimedia broadcasting program with the first PC; and is also used to use streaming media players thereof to play the received multimedia broadcasting program in a format of streaming media;

the first PC is used to forward the sharing requests to the wireless data terminal; and is also used to forward the received multimedia broadcasting program in the format of streaming media to the other PCs which send the sharing requests; and the wireless data terminal is used to convert the multimedia broadcasting program to be in the format of streaming media after receiving the sharing requests, and then to send the program to the first PC.

Furthermore, the above system may also have the following features:

the wireless data terminal communicates with the first PC via the universal serial bus (USB) network device interface; an interne protocol (IP) address IP1 of the wireless data terminal locates in the same subnet in which the IP address IP2 of the USB network device interface in the first PC locates, while does not locate in the same subnet in which the IP address IP3 of the first PC locates; the first PC saves a routing relationship between IP2 and IP3.

Furthermore, the above system may also have the following features:

a USB transmission module in the wireless data terminal comprises a network device interface management module which is used to enumerate the interface in the wireless data terminal for transmitting the multimedia broadcasting program to the first PC as a standard network device interface.

Furthermore, the above system may also have the following features:

the wireless data terminal also comprises a streaming media server module which connects with the network device interface management module at one end and with the multimedia broadcasting data processing module at the other end, and the streaming media server module is used to convert data received from the multimedia broadcasting data processing module to be in a format of streaming media and send the data to the network device interface management module; and the network device interface management module is also used to send the received multimedia broadcasting program in the format of streaming media to the first PC.

Furthermore, the above system may also have the following features:

the first PC also comprises a standard streaming media player which is used to play the received multimedia broadcasting program in the format of streaming media.

PREFERRED EMBODIMENTS OF THE PRESENT INVENTION

The technical scheme of the present invention will be further described in detail in combination with the accompanying figures and embodiments.

In order to solve the above technical problem, the present invention provides a system for sharing the multimedia broadcasting programs, and the system comprises a first PC and a wireless data terminal which work cooperatively with each other and other PCs which are in the same subnet in which the first PC locates; the above wireless data terminal communicates with the first PC via the USB network device interface; the IP address IP1 of said wireless data terminal is in the same subnet in which the IP address IP2 of the USB network device interface in the first PC is, while is not in the same subnet in which the IP address IP3 of said first PC is; said first PC saves the routing relationship between the IP2 and IP3.

Said other PCs are used to send sharing requests to the first PC when wanting to share the multimedia broadcasting program with the first PC; and also used to use the streaming media player thereof to play the received multimedia broadcasting program in the format of streaming media.

The first PC is used to forward the sharing requests to said wireless data terminal; and also used to forward the received multimedia broadcasting program in the format of streaming media to other PCs which send the sharing requests.

The wireless data terminal is used to convert the multimedia broadcasting program into the format of streaming media, and then to send the program to said first PC.

Figure 1:
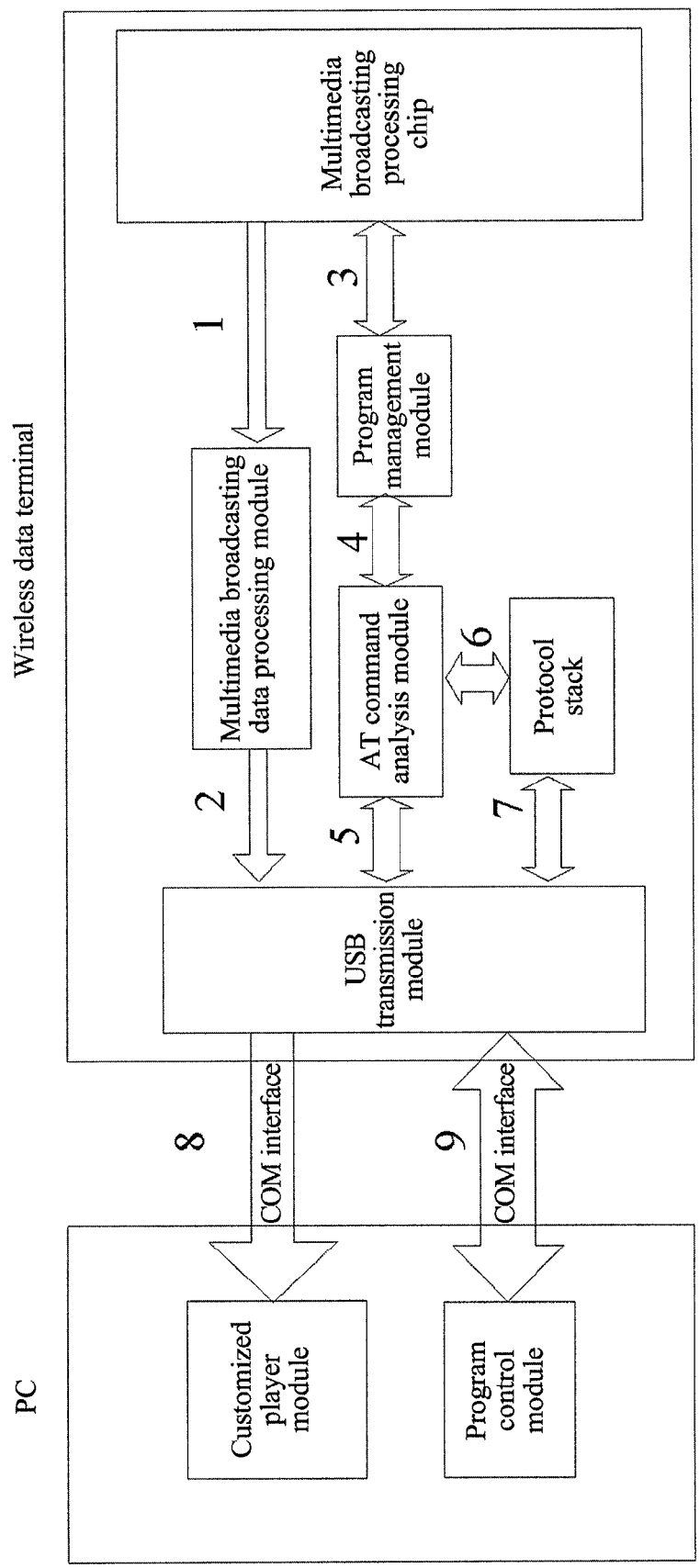
FIG. 1 is a structural block diagram of the system of the wireless data terminal supporting the multimedia broadcasting in the prior art.
Figure 2:
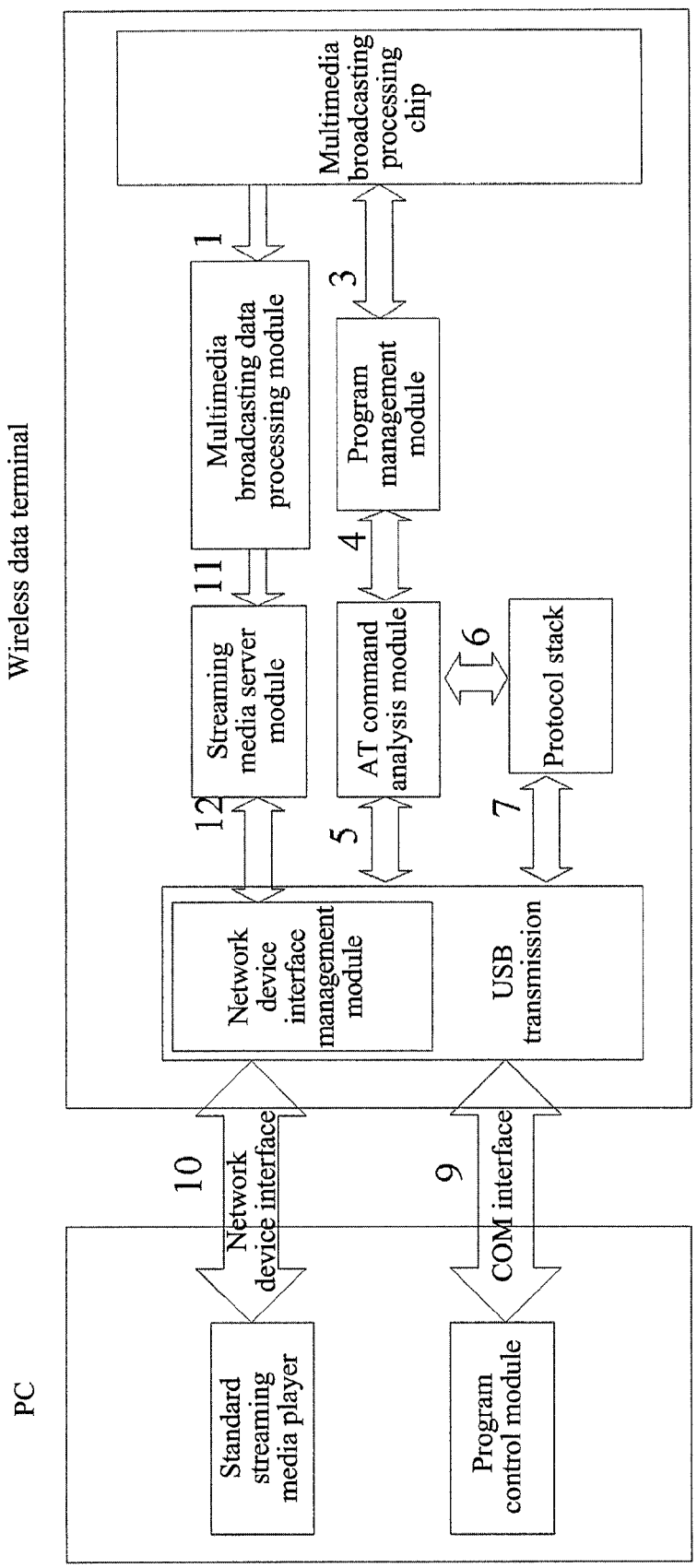
FIG. 2 is a structural block diagram of the wireless data terminal and the PC which work cooperatively with each other in accordance with an embodiment of the present invention.

FIG. 2 is a structural diagram of the PC and the wireless data terminal which work cooperatively with each other. Wherein, a streaming media server module and a network device interface management module are added into the wireless data terminal, moreover, a standard streaming media player is configured in the PC. The above network device interface management module is located in the USB transmission module, and it connects with the above standard streaming media player via the network device interface at one end and connects with the streaming media server module at the other end, while the other end of the streaming media server module connects with the multimedia broadcasting data processing module.

Wherein, the streaming media server module is used to convert the data received from the multimedia broadcasting data processing module into the format of streaming media and send the data to the network device interface management module;

the network device interface management module is used to enumerate the USB network device interface and transmit the data. When the wireless data terminal starts up, it is used to enumerate the interface in the module which connects with the standard streaming media player in the PC as the standard USB network device interface; in the normal data transmission process, it is used to send the data sent from the PC via the USB network device interface to the streaming media server in the format of standard IP packets, and converts the IP packets sent from the streaming media server according to the USB protocol requirements and sends them to the PC via the USB network device interface;

the standard streaming media player supports streaming media protocols such as the standard real-time transport protocol (RTP), the RTP control protocol (RTCP), and the real time streaming protocol (RTSP), and it is used to play the multimedia broadcasting program in the format of streaming media sent from the wireless data terminal via the network device interface.

The present invention also provides a method for sharing the multimedia broadcasting programs, and the method comprises:

when other PCs in the network want to share the multimedia broadcasting program with the first PC configured with the a wireless data terminal in the same subnet, they send sharing requests to the first PC which will forward the requests to the wireless data terminal; after converting the multimedia broadcasting program into the format of streaming media, the wireless data terminal sends the program to the above PCs which initiate the sharing requests via the first PC; after the PCs receive the program, they use the streaming media player thereof to play the received multimedia broadcasting program, i.e. implement the sharing of the multimedia broadcasting program.

Wherein, said wireless data terminal communicates with first PC via the USB network device interface; the IP address IP1 of the wireless data terminal is in the same subnet in which the IP address IP2 of the USB network device interface in the first PC, while is not in the same subnet in which the IP address IP3 of said first PC; and the first PC saves the routing relationship between the IP2 and IP3.

In the PCs which send the sharing requests, it needs to assign the URL (uniform resource locator) address to IP1 in the streaming media players, therefore, the sharing request messages generated in the players are sent to the network and arrive at the IP3 interface in the first PC, and then are sent to the IP2 interface via the route, and the sharing request messages are further sent to the above wireless data terminal via the IP2 interface; after receiving the above sharing request message, the wireless data terminal sends the multimedia broadcasting program in the format of streaming media to the PC which sends the sharing request in the reverse path.

Herein, since the wireless data terminal converts the received multimedia broadcasting program into the format of streaming media, the first PC needs to play it via a standard streaming media player if it wants to watch the multimedia broadcasting program. The specific playing process is: the first PC assigns the URL address to the IP1 in its standard streaming media player, and the IP data generated by the player which arrives at IP1 will be sent to the IP2 interface, while the multimedia broadcasting program in the format of streaming media sent from the wireless data terminal which arrives at the IP2 will be received and played by the player.

An application example of the present invention will be described in further detail as follows.

Figure 3:
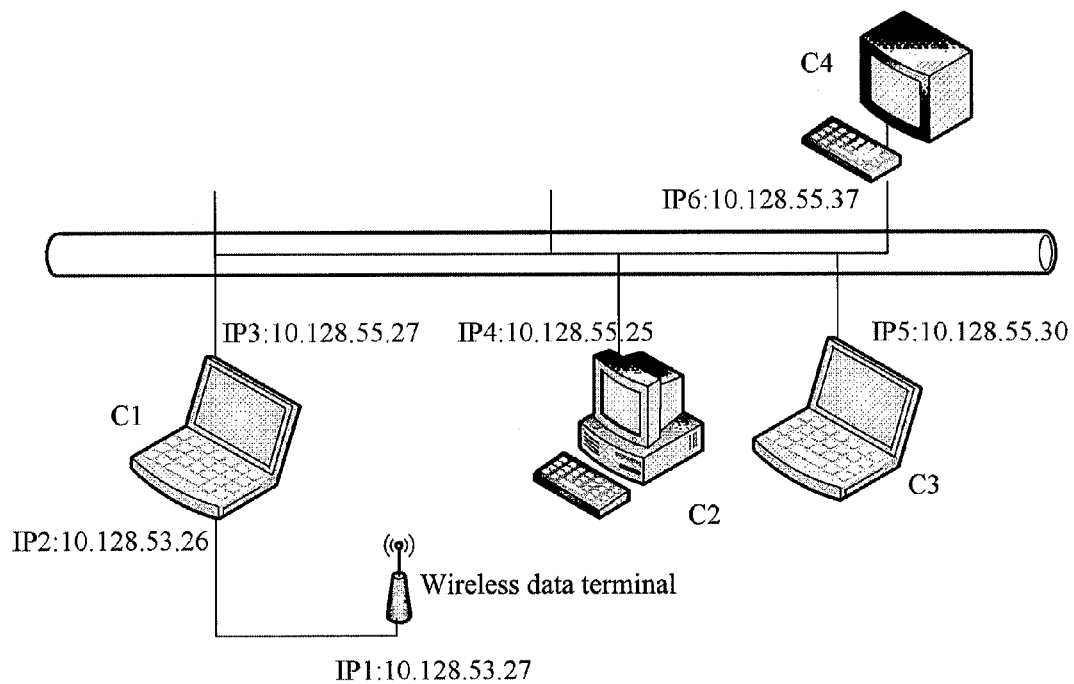
FIG. 3 is a network topology diagram of an application example of the present invention.
Figure 4:
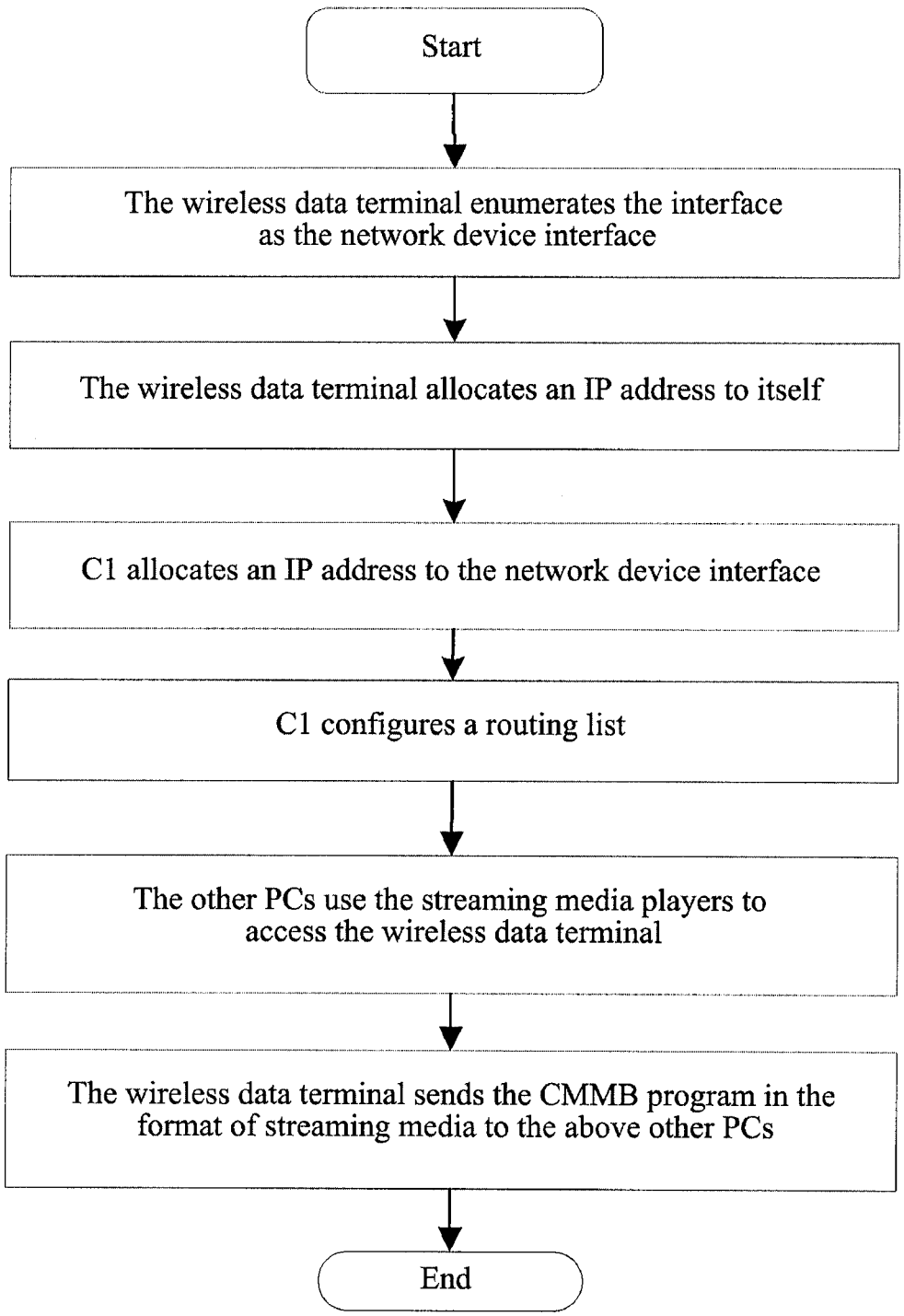
FIG. 4 is a flow chart of an application example of the present invention.

To take the network topology shown in FIG. 3 for example, it illustrates a method for sharing the multimedia broadcasting program (such as the CMMB), and as shown in FIG. 4, the method comprises the following steps:

a. When starting up, the wireless data terminal device enumerates its interface which works with its cooperative PC C1 to transmit the multimedia broadcasting programs as a standard network device interface rather than a conventional COM interface; it also assigns a fixed IP address IP1 to itself;

b. C1 assigns a IP address IP2 which is in the subnet in which the wireless data terminal is located to its network device interface connecting with the wireless data terminal, and also sets a subnet mask for the network device interface;

c. Set the routing relationship of the IP2 to the C1's IP address IP3 in the IP network. The process of setting the IP address IP3 for C1 can be processed in any step before this one, wherein, IP3 is not in the same subnet in which the IP1 and IP2 are located;

d. When C3 plans to share the CMMB program, it assigns the URL address to IP1 in its streaming media player, and the sharing request message sent by C3 is sent to the IP2 interface via the route after through the IP3 interface of C1, and the IP2 interface sends the sharing request message to the above wireless data terminal; and then the wireless data terminal sends the CMMB program in the format of streaming media to C3 in the reverse path after receiving the above sharing request message; and e. C3 uses its streaming media player to play the received CMMB program.

It should be noted that all IP addresses in FIG. 3 can be modified into others in the actual implementation process, as long as IP1 and IP2 are ensured to be in the same subnet, and they are not in the same subnet in which IP3, IP4, and so on, are located.

Of course that the present invention has other embodiments, without departing from the spirit and essence of the present invention, those skilled in the art can make all kinds of corresponding modifications or variations according to the present invention, which should belong to the protection scope of the appended claims of the present invention.

INDUSTRIAL APPLICABILITY

With the method and system described in the present invention, the multimedia broadcasting signal received through the wireless can be shared in a wired network, so that other PCs in the same subnet in which the PC in which the wireless data terminal locates is located can also play the multimedia broadcasting program in real time.

What is claimed is:

1. A method for sharing multimedia broadcasting programs, applied among a plurality of personal computers (PCs) in the same subnet among which a first PC is configured with a wireless data terminal, and said method comprising:
when other PCs in the subnet want to share a multimedia broadcasting program with said first PC, the PCs sending sharing requests to said first PC, said first PC forwarding the sharing requests to said wireless data terminal; after converting the multimedia broadcasting program to be in a format of streaming media, said wireless data terminal sending the program to the PCs which send the sharing requests via said first PC, wherein: said wireless data terminal communicates with said first PC via an universal serial bus (USB) network device interface; an internet protocol (IP) address IP1 of said wireless data terminal is in the same subnet in which the IP address IP2 of the USB network device interface in said first PC is, while is not in the same subnet in which the IP address IP3 of said first PC is; and said first PC saves a routing relationship between IP2 and IP3.

2. A method of claim 1, wherein:
the USB network device interface in said wireless data terminal is obtained by enumerating said interface by said wireless data terminal.

3. A method of claim 2, further comprising:
before sending said sharing requests, said PCs assigning uniform resource locator (URL) address to the IP1 in streaming media players in said PCs.

4. A method of claim 2, wherein:
the IP address IP1 of said wireless data terminal is allocated by said wireless data terminal.

5. A method of claim 4, further comprising:
before sending said sharing requests, said PCs assigning uniform resource locator (URL) address to the IP1 in streaming media players in said PCs.

6. A method of claim 1, further comprising:
before sending said sharing requests, said PCs assigning uniform resource locator (URL) address to the IP1 in streaming media players in said PCs.

7. A method of claim 1, further comprising:
after converting the multimedia broadcasting program to be in the format of streaming media, said wireless data terminal sending the program to said first PC; after receiving the program, said first PC using a standard streaming media player thereof to play said multimedia broadcasting program.

8. A system for sharing multimedia broadcasting programs,
comprising: a first personal computer (PC) and a wireless data terminal working cooperatively with each other, and other PCs which are located in the same subnet in which said first PC locates; wherein:
said other PCs is used to send sharing requests to the first PC when said other PCs want to share the multimedia broadcasting program with said first PC; and is also used to use streaming media players thereof to play the received multimedia broadcasting program in a format of streaming media;
said first PC is used to forward said sharing requests to said wireless data terminal; and is also used to forward the received multimedia broadcasting program in the format of streaming media to said other PCs which send the sharing requests; and
said wireless data terminal is used to convert the multimedia broadcasting program to be in the format of streaming media after receiving said sharing requests, and then to send the program to said first PC, wherein: said wireless data terminal communicates with said first PC via the universal serial bus (USB) network device interface; an internet protocol (IP) address IP1 of said wireless data terminal locates in the same subnet in which the IP address IP2 of the USB network device interface in said first PC locates, while does not locate in the same subnet in which the IP address IP3 of said first PC locates; said first PC saves a routing relationship between IP2 and IP3.

9. A system of claim 8, wherein:
a USB transmission module in said wireless data terminal comprises a network device interface management module which is used to enumerate the interface in the wireless data terminal for transmitting the multimedia broadcasting program to said first PC as a standard network device interface.

10. A system of claim 9, wherein:
said wireless data terminal also comprises a streaming media server module which connects with said network device interface management module at one end and with the multimedia broadcasting data processing module at the other end, and said streaming media server module is used to convert data received from said multimedia broadcasting data processing module to be in a format of streaming media and send the data to said network device interface management module; and
said network device interface management module is also used to send the received multimedia broadcasting program in said format of streaming media to said first PC.

11. A system of claim 10, wherein:
said first PC also comprises a standard streaming media player which is used to play the received multimedia broadcasting program in said format of streaming media.

12. A system of claim 8, wherein:
said wireless data terminal also comprises a streaming media server module which connects with said network device interface management module at one end and with the multimedia broadcasting data processing module at the other end, and said streaming media server module is used to convert data received from said multimedia broadcasting data processing module to be in a format of streaming media and send the data to said network device interface management module; and
said network device interface management module is also used to send the received multimedia broadcasting program in said format of streaming media to said first PC.

13. A system of claim 12, wherein:
said first PC also comprises a standard streaming media player which is used to play the received multimedia broadcasting program in said format of streaming media.

14. A system of claim 7, wherein:
said wireless data terminal also comprises a streaming media server module which connects with said network device interface management module at one end and with the multimedia broadcasting data processing module at the other end, and said streaming media server module is used to convert data received from said multimedia broadcasting data processing module to be in a format of streaming media and send the data to said network device interface management module; and
said network device interface management module is also used to send the received multimedia broadcasting program in said format of streaming media to said first PC.

15. A system of claim 14, wherein:
said first PC also comprises a standard streaming media player which is used to play the received multimedia broadcasting program in said format of streaming media.

* * * * *

UNITED STATES PATENT AND TRADEMARK OFFICE
CERTIFICATE OF CORRECTION

PATENT NO. : 8,417,830 B2  
APPLICATION NO. : 13/202900  
DATED : April 9, 2013  
INVENTOR(S) : Suguang Guo Page 1 of 1

It is certified that error appears in the above-identified patent and that said Letters Patent is hereby corrected as shown below:

In the Claims

Column 6, Line 64, Claim 3:

After "A method of claim"  
Delete "2" and insert -- 1 --.

Column 7, Line 1, Claim 4:

After "A method of claim"  
Delete "2" and insert -- 1 --.

Column 7, Line 8, Claim 6:

After "A method of claim"  
Delete "1" and insert -- 2 --.

Column 8, Line 37, Claim 14:

After "A system of claim"  
Delete "7" and insert -- 8 --.

Signed and Sealed this  
Twenty-fourth Day of December, 2013

Margaret A. Focarino  
*Commissioner for Patents of the United States Patent and Trademark Office*

UNITED STATES PATENT AND TRADEMARK OFFICE
CERTIFICATE OF CORRECTION

PATENT NO. : 8,417,830 B2  Page 1 of 1
APPLICATION NO. : 13/202900
DATED : April 9, 2013
INVENTOR(S) : Suguang Guo It is certified that error appears in the above-identified patent and that said Letters Patent is hereby corrected as shown below:

On the title page insert:

item -- (30)    Foreign Application Priority Data

March 25, 2009 (CN) ............. 200910130198.4 --.

Signed and Sealed this
Twentieth Day of May, 2014

Michelle K. Lee
*Deputy Director of the United States Patent and Trademark Office*